Figure 1:
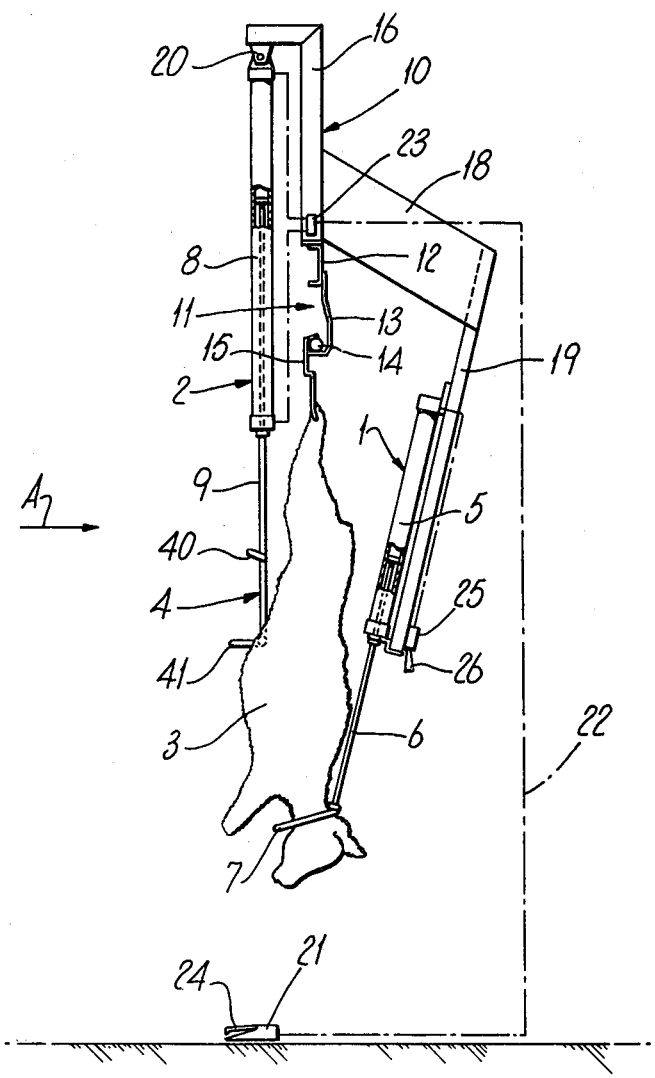

United States Patent [19]

Noroy

[11] 4,376,326
[45] Mar. 15, 1983

[54] APPARATUS FOR FLAYING OF SMALL CATTLE, ESPECIALLY SHEEP CARCASSES, IN SLAUGHTERING

[75] Inventor: Terje Noroy, Tronerudvn, Norway

[73] Assignee: Hamjern A/S, Hamar, Norway

[21] Appl. No.: 281,310

[22] Filed: Jul. 8, 1981

[30] Foreign Application Priority Data

Jul. 11, 1980 [NO] Norway ................................ 802104

[51] Int. Cl.³ .............................................. A22B 5/16
[52] U.S. Cl. ...................................................... 17/21
[58] Field of Search .................. 17/21, 62, 50; 99/584

[56] References Cited

U.S. PATENT DOCUMENTS

| | | | |
|---|---|---|---|
| 2,914,795 | 12/1959 | Lindstrom et al. | 17/21 |
| 3,443,275 | 5/1969 | Radtke | 17/21 |
| 3,545,037 | 12/1970 | Anderson | 17/21 |
| 4,299,010 | 11/1981 | Robertson et al. | 17/21 X |

*Primary Examiner*—Willie G. Abercrombie

[57] ABSTRACT

An apparatus for flaying of hanging sheep carcasses which are suspended from the hind legs, comprises a stretching device (1) which, by means of a holder means (7), is arranged to be connected with the head of a sheep carcass (3) and to exert downward-directed stretching force thereon, and a flayer driving device (2) having a flayer (4) which is arranged for reciprocating movement along the ventral side of the sheep carcass for executing flaying in the direction from a pocket which is formed in advance by manually flaying around the navel of the carcass. Both the stretching device (1) and the flayer driving device (2) consists of a cylinder/piston unit (5 resp. 8) with a piston rod (6 resp. 9) on the free end of which the holder means (7) and the flayer (4) respectively, is mounted, and both units are mounted on a common support (10) which is attached to an overhead conveyor (11), so that the piston rods (6, 9) are moved in the direction towards the floor by movement in the direction from their inner position to their outer position.

9 Claims, 7 Drawing Figures

U.S. Patent    Mar. 15, 1983    Sheet 1 of 4    4,376,326

APPARATUS FOR FLAYING OF SMALL CATTLE, ESPECIALLY SHEEP CARCASSES, IN SLAUGHTERING

The present invention relates to an apparatus for flaying of small cattle, especially sheep carcasses, in slaughtering, the sheep carcasses being suspended from the hind legs, e.g. in an overhead conveyor.

Traditionally the flaying process in connection with sheep slaughtering has been a time-consuming and strenuous work as the flaying has taken place manually in that the skin by means of "raw muscular force" is torn off over the breast of the sheep carcass.

Apart from the strenuous flaying the carcass is also to a great extent subject to direct touch, so that the carcass is not so hygienically treated as desirable.

The object of the invention is to provide an apparatus enabling rational and rapid flaying without physical efforts, at the same time as there is achieved a more hygienic treatment of the carcass than previously.

For the achievement of the above-mentioned object there is provided an apparatus for flaying of suspended sheep carcasses such as stated above, and which, according to the invention, is characterized in that it comprises a stretching device which is arranged to be connected with a forward part of the carcass and to exert a downward-directed stretching force thereon, and a flayer driving device with a flayer arranged for reciprocating movement along the ventral side of the carcass, the flayer being designed for introduction into a pocket formed in advance by manual flaying of a ventral portion of the carcass, and for executing flaying by movement along the ventral side from said pocket.

An advantageous embodiment of the invention is characterized in that the stretching device and the flayer driving device each comprises a cylinder/piston unit having a piston rod on the free end of which a holder means for connection with the head of the carcass and the flayer, respectively, is mounted, the cylinders of both units being mounted on a common support for attachment to an overhead conveyor, for downward movement of the piston rods when they are moved in the direction from their inner position to their outer position.

Figure 2:
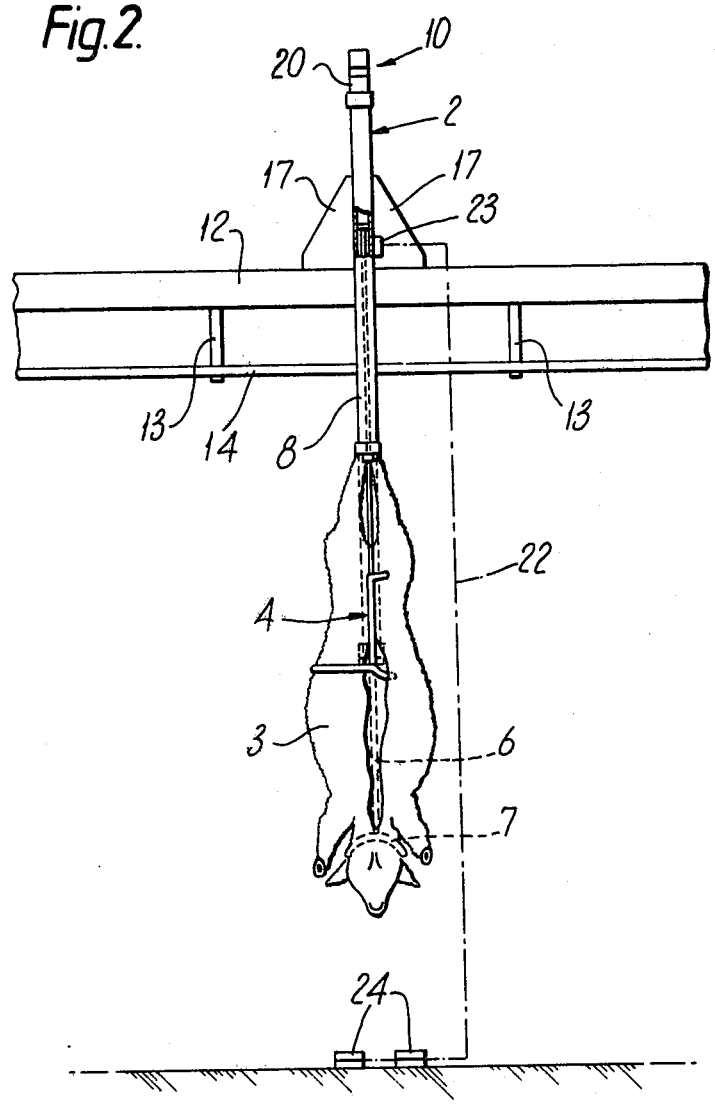
Figure 3:
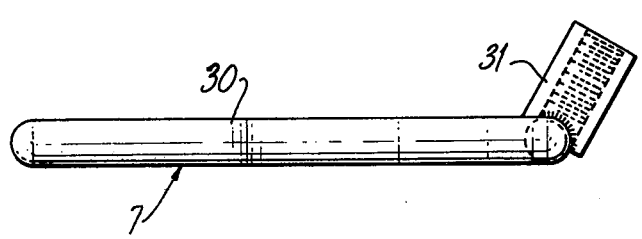
Figure 4:
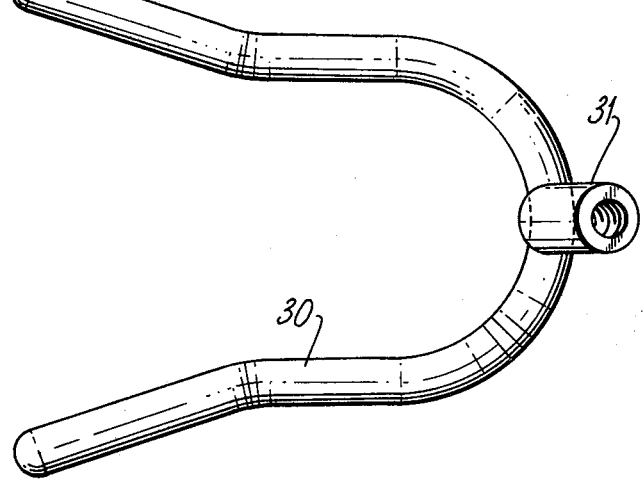
Figure 7:
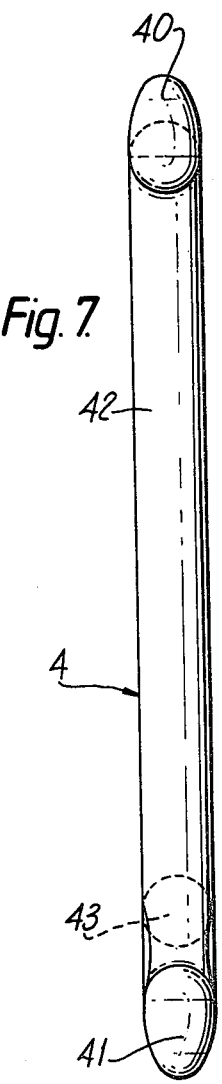
Figure 5:
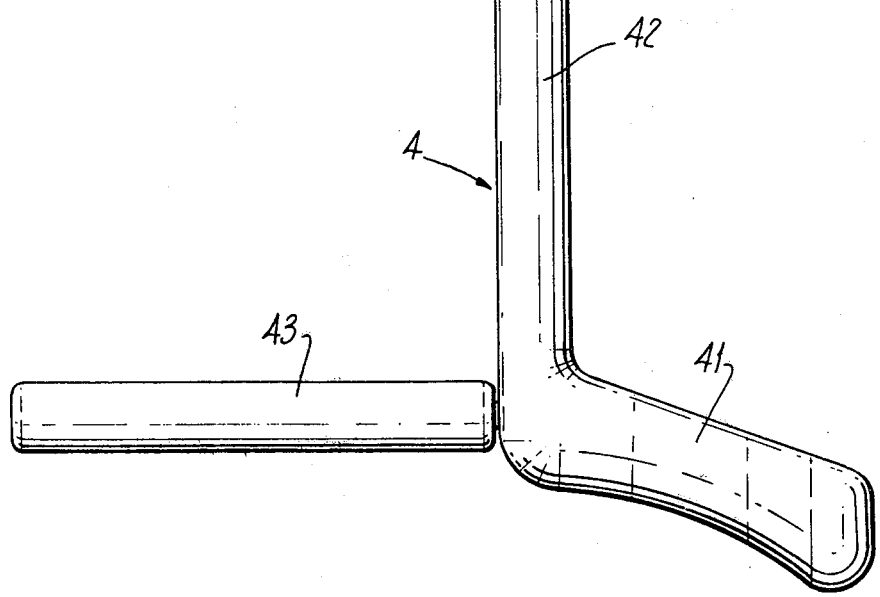
Figure 6:
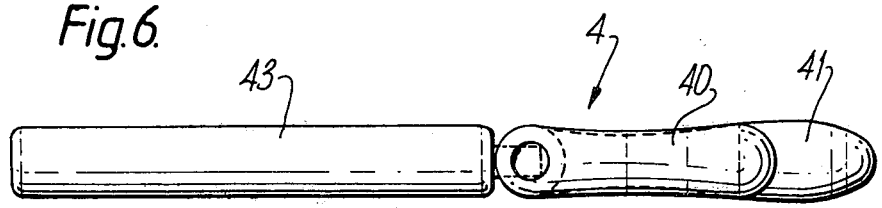

The invention will be more closely described below in connection with exemplary embodiments with reference to the accompanying drawings, wherein FIG. 1 shows a schematic side view of an apparatus according to the invention with a sheep carcass suspended in connection therewith;

FIG. 2 shows a side view of the apparatus in FIG. 1, as viewed in the direction of the arrow A in FIG. 1;

FIGS. 3 and 4 show a side view and a plan view, respectively, of a holder forming part of the stretching means; and FIGS. 5, 6 and 7 show a side view, a plan view and a front view, respectively, of a preferred embodiment of the flayer forming part of the apparatus according to FIGS. 1 and 2.

Such as appears from FIGS. 1 and 2, the apparatus according to the invention is constructed for flaying of sheep carcasses which are suspended from the hind legs in e.g. a so-called overhead conveyor in a butchery, wherein the sheep carcasses are advanced along the overhead conveyor between different stations, e.g. from the illustrated flayer station to a skin puller station having a skin puller of the type disclosed in the Applicant's co-pending U.S. patent application No. 247,531, filed on Mar. 3, 1981.

The apparatus primarily comprises a stretching device 1 which is adapted to be connected with the head of a sheep carcass 3 and to exert a downward-directed stretching force thereon, and a flayer driving device 2 having a flayer 4 which is adapted for reciprocating movement along the ventral side of the sheep carcass 3 and to thereby carry out the necessary flaying.

The stretching device 1 comprises a cylinder/piston unit 5 having a piston rod 6 on the free end of which there is attached a holder means 7 for connection with the head of the sheep carcass 3 as shown. The flayer driving device also comprises a cylinder/piston unit 2 having a piston rod 9 on the free end of which the flayer 4 is mounted. Both cylinder/piston units are mounted on a common rack or support 10 which in turn is fixedly mounted on a horizontally extending overhead conveyor 11. The overhead conveyor comprises a channel-shaped girder 12 having a number of depending brackets 13 carrying a pipe or tube path 14 which is transportable on said brackets. The tube path in turn carries hooks 15 from which sheep carcasses are suspended as shown.

The support 10 comprises an angular bracket 16 upstanding from the the girder 12 and having side brackets 17 (FIG. 2), and a further bracket 18 attached to the angular bracket 16 and projecting laterally from the overhead conveyor. At the free end of the bracket 18 there is attached a supporting arm 19 extending obliquely downwards. On this supporting arm the cylinder 5 of the stretching device is rigidly attached, so that its piston rod 6 points in the direction of the region of the head of the sheep carcass 3. The supporting arm 19 may possibly be adjustably attached to the bracket 18. The cylinder 8 of the flayer driving device is at its upper end, as illustrated, pivotally mounted in a holder 20 which is attached to the outwards projecting end of the angular bracket 16, so that the cylinder/piston unit 8 depends on the opposite side of the overhead conveyor 11 in relation to the cylinder/piston unit 5 of the stretching device.

The cylinder/piston units 5 and 8 are preferably pneumatically driven or actuated, but may also be actuated hydraulically. Such as schematically illustrated in FIGS. 1 and 2, the cylinder/piston unit 8 of the flayer driving device is arranged to be operated by means of a foot lever or pedal means 21 which by way of control lines 22 (shown with dot- and- dash lines) is connected to a control valve 23 mounted on the support 10 for controlling the supply of driving fluid to the cylinder/piston unit. Thus, an operator may simply control the outward and downward movement of the piston rod 9 by suitable influence of the pedals 24 of the foot pedal means 21, at the same time as the flayer 4 is operated such as more closely described below. Such as further schematically illustrated in FIG. 1, the cylinder/piston unit 5 of the stretching device is provided with a control valve 25 which by suitable influence of a manual operating lever 26 controls the supply of driving fluid to this unit.

Said operating arrangement with associated cable installation and control means is not more closely shown and described, as it is of technical kind and easily will be able to be arranged by a person skilled in the art.

In FIGS. 3 and 4 there is shown a simple and appropriate embodiment of the holder means 7 of the stretching device, wherein said means consists of an essentially U-shaped caliper 30 to the web portion of which there is attached a suitably inclined, threaded sleeve 31 which can be threaded on to the piston rod 6 of the stretching device. As shown, the arms of the U-shaped caliper are outwards diverging in the outer area, and the distance between the arms in the inner area is adapted such that the arms come to rest against the head of the sheep carcass when the neck of the carcass has been introduced into the caliper 30 and the piston rod 6 is thereafter extended.

In FIGS. 5-7 there is shown an appropriate embodiment of the flayer 4. More specifically, the flayer comprises an upper and a lower flayer member or flayer arm 40 and 41, respectively, which arms at respective ends are interconnected by means of a straight stay or rod member 42 and project outwards from the rod member at the same side thereof. Like the aforementioned caliper, the flayer is made of polished stainless steel. The rod member 42 has a length of 30 cm, and this length corresponds approximately to half the stroke length of the piston rod 9 of the flayer driving device 2, which is appropriate for rational operation such as more closely described below.

Such as appears from FIG. 5, the flayer arms 40, 41 extend in diverging directions from the rod member 42, and the upside of the upper arm 40 has an upwards convex contour, whereas the underside of the lower arm 41 has a downwards convex contour. Such as appears from FIG. 7, the flayer arms have an oval or approximately eliptic cross-section. Further, the flayer 4 is provided with a handle 43 which by means of a screw connection is attached to the rod member 42 at its lower end and projects outwards from the rod member in a direction which is opposite to the direction of the flayer arms 40, 41.

As shown in FIG. 5, the rod member 42 is provided at its upper end with a threaded hole 44 for threading of the flayer 4 on to the lower end of the piston rod 9 of the flayer driving device.

The operation of the apparatus will be more closely described below.

A sheep carcass 3 is suspended from the hind legs in the overhead conveyor 11. The cylinder/piston unit 5 of the stretching device 1 is approximately in an intermediate position, i.e. the piston rod 6 is extended to half the stroke length. The neck of the sheep carcass is thereafter inserted into the holding caliper 30, and the piston rod 6 is driven towards its outer position by suitable actuation of the operating lever 26. The sheep carcass is now stretched, and the flaying proper can start.

The use of the shown apparatus presupposes that the sheep carcass in advance has been flayed manually in the navel region of the carcass, so that a pocket is formed on each side of the navel. In the starting position for flaying the cylinder/piston unit 8 of the flayer driving device 2 is positioned so that the piston rod 9 is in the intermediate position wherein the upper flayer arm 40 is then located on a level with said preformed pockets. The upper flayer arm is introduced into one of the pockets, e.g. on the right side of the navel. The piston rod 9 is driven upwards towards its inner position, i.e. zero stroke length, by influence of the foot pedal means 21. The flayer then flays upwards along the flank on one side up to the hind legs. When this is done, the lower flayer arm 41 is in position, i.e. on a level with the preformed pockets.

The lower flayer arm 41 is thereafter introduced into the pocket on the right side of the navel, and the piston rod 9 is extended towards full stroke length. The flayer then flays the breast portion on the side in question. Before the piston rod 9 has been driven out to full stroke length, it is driven somewhat backwards again by means of the foot pedal means 21, whereafter it is once more driven out towards full stroke length. The flayer then flays outwards along the foreleg on the current side. Thus, when the piston rod reaches full stroke length, the upper portion of the ventral side of the sheep carcass together with the breast and the foreleg on the right side is flayed.

The piston rod 9 is thereafter returned to half stroke length, and operations corresponding to those described above, are carried out on the left side. When this is done, the flaying is completed and the carcass is ready for pulling-off of the skin. This operation can be carried out on a subsequent station along the overhead conveyor, and appropriately with a skin puller according to the aforementioned U.S. Pat. application No. 247,531.

Even if a particular embodiment of the apparatus according to the invention has been described above, it will be apparent that several structural modifications may be made without departing from the principle of the invention. For example, as regards the flayer, this can, instead of a single upper flayer arm 40 as shown, comprise a pair of oppositely directed, upper flayer arms, so that the upper part of the flayer is T-shaped, and so that both sides of the upper ventral side portion of the sheep carcass are flayed simultaneously by a single upward working movement of the piston rod. However, it has been found that the shown embodiment of the flayer is preferable as, in practice, it provides an equally rapid and simultaneously more secure and better flaying in point of quality.

What I claim is:

1. An apparatus for flaying of small cattle, especially sheep carcasses, in slaughtering, the sheep carcasses being suspended from the hind legs, e.g. in an overhead conveyor, said apparatus comprising a stretching device which is arranged to be connected with a forward part of the carcass and to exert a downward-directed stretching force thereon, and a flayer driving device with a flayer arranged for reciprocating movement along the ventral side of the carcass, said flayer being designed for introduction into a pocket formed in advance by manual flaying of a ventral portion of the carcass, and for executing flaying by movement along the ventral side from said pocket.

2. An apparatus according to claim 1, wherein said stretching device and said flayer driving device each comprises a cylinder/piston unit having a piston rod on the free end of which a holder means for connection with the head of the carcass and the flayer, respectively, is mounted, the cylinders of both units being mounted on a common support for attachment to an overhead conveyor, for downward movement of said piston rods when they are moved in the direction from their inner position to their outer position.

3. An apparatus according to claim 2, wherein the cylinder of said flayer driving device at its upper end is pivotally attached to said support on one side of said overhead conveyor, whereas the cylinder of said stretching device is rigidly attached to the support on the other side of the overhead conveyor and is inclined with the piston rod pointing in the direction towards the region of a head of a suspended sheep carcass.

4. An apparatus according to any one of the claims 1-3, wherein said flayer comprises an upper and a lower flayer arm which arms at respective ends are interconnected by means of a rod member and project outwards from the rod member on the same side thereof.

5. An apparatus according to claim 4, wherein said rod member has a length approximately corresponding to half the stroke length of the piston rod of said flayer driving device.

6. An apparatus according to claim 4, wherein said flayer arms extend in diverging directions from said rod member and have approximately elliptic cross-sections with the major axis directed along the axis of the rod member.

7. An apparatus according to claim 4, wherein said flayer is provided with a handle which is attached to said rod member and projects outwards therefrom in a direction opposite to that of said flayer arms.

8. An apparatus according to claim 2, wherein said holder means comprises an essentially U-shaped caliper which in its web portion is attached to said piston rod of said stretching device and is adapted to receive the neck of a sheep carcass.

9. An apparatus according to claim 2, wherein said cylinder/piston unit of the flayer driving device is arranged to be operated by means of an operator-actuated foot pedal means.

* * * * *